UNITED STATES PATENT OFFICE 2,580,730

STABILIZED CHLORINATED PARAFFINS

James M. Church, Tenafly, and Ernest W. Johnson, Mountainside, N. J., assignors to Metal & Thermit Corporation, New York, N. Y., a corporation of New Jersey No Drawing. Application May 4, 1948,
Serial No. 25,074

10 Claims. (Cl. 260—652.5)

This invention relates to the stabilization of chlorinated paraffins having about 10 to about 40 carbon atoms per molecule with tin hydrocarbon compounds, and to the stabilized product. More particularly, it relates to the stabilization of chlorinated paraffins with tin hydrocarbon compounds having the general formula: $R_xAr_{4-x}Sn$, in which R stands for an alkyl radical, Ar is an aryl radical, Sn, of course, is tin, and $x$ is a numeral equal to 1, 2, 3 or 4.

The efficiency and use of chlorinated paraffins of the kind described is hindered in many applications by their tendency to decompose. This tendency renders them objectionable as coating agents for textiles, paper, and other materials, for which use they otherwise have certain advantageous properties. Thus, when applied to textiles as flameproofing agents, they tend to break down over a period of time, forming hydrogen chloride, which attacks the textile material. The same is true in the case of paper, and in this case there are other disadvantages arising out of the fact that the chlorinated paraffins are applied to the paper at elevated temperatures. Not only do the chlorinated paraffins, which must be kept hot for some time prior to use, undergo degradation, but the hydrogen chloride formed has a tendency to pit the metal rolls used for applying them to the paper. In addition, paper coated with them may darken or discolor as a result of the decomposition.

According to the invention, chlorinated paraffins may be stabilized for general use by adding to them a small quantity of one or more of the class of compounds defined above. These compounds are both compatible with the chlorinated paraffins and do not adversely affect their properties. The compounds include tin tetraalkyls, in which the alkyl group may be methyl, ethyl, propyl, butyl, isobutyl, amyl, etc. or in which the alkyl group may be mixed, as in dibutyldipropyl tin, tributylethyl tin, etc. The compounds also include mixed alkyl-aryl compounds of tin such as dibutyldiphenyl tin, tributylphenyl tin, etc. The chlorinated paraffins to be stabilized may contain varying amounts of chlorine, ranging from about 1 to about 70% or more. By chlorinated paraffins is meant the lower molecular weight, non-polymerizable, chlorinated paraffin hydrocarbons having about 10 to about 40 carbon atoms per molecule. The stabilizer may be added thereto in amounts up to about 5% by weight, preferably at least 1%. The stabilizer is then intimately dispersed in the chlorinated paraffins in any suitable way, such as by melting and stirring the mixture, or the chlorinated paraffins and the stabilizer may be dissolved in a low boiling solvent and the solvent later evaporated.

The following examples may illustrate the invention. In each example in Table I, a chlorinated paraffin containing about 70% chlorine was melted and heated to various temperatures in order to decompose it. The extent of the decomposition was indicated by the amount of hydrogen chloride gas evolved, the gas being collected and measured at periodic intervals. In each case, also, at least one other sample of the same amount of the chlorinated paraffin, but containing a stabilizing agent, was heated to the same temperature, and the amount of gas evolved was measured at the same time intervals as before.

*Table I*

| | | | HCl Gas Evolved, mg. | | | |
|---|---|---|---|---|---|---|
| | | | | Chlorinated Paraffin Plus— | | |
| Exam. No. | Temp., °C. | Time, hrs. | No Stabilizer | 1% Bu$_3$PhSn | 1% Bu$_2$Ph$_2$Sn | 1% Bu$_4$Sn |
| 1 | 100 | 1 | 0.31 | 0.04 | | |
| 2 | 100 | 2 | 0.57 | 0.095 | | |
| 3 | 100 | 3 | 0.86 | 0.15 | | |
| 4 | 100 | 4 | 1.11 | 0.23 | | |
| 5 | 150 | 1 | 14 | 1 | 1 | 1 |
| 6 | 150 | 2 | 21 | 1 | 1 | 2 |
| 7 | 150 | 4 | 27 | 1 | 1 | 3 |
| 8 | 150 | 8 | 32 | 1 | 1 | |
| 9 | 150 | 12 | 37 | 1 | 2 | |
| 10 | 150 | 16 | 43 | 4 | 12 | |
| 11 | 150 | 20 | 56 | 16 | 28 | |
| 12 | 175 | 0.5 | 26 | 1 | 0 | |
| 13 | 175 | 1 | 50 | 5 | 1 | |
| 14 | 175 | 2 | 69 | 18 | 57 | |

Bu$_3$PhSn = tributylphenyl tin.
Bu$_2$Ph$_2$Sn = dibutyldiphenyl tin.
Bu$_4$Sn = tetrabutyl tin.

As may be seen, at each temperature level the decomposition of the stabilized chlorinated paraffin was effectively retarded by the stabilizing agent, the effect being particularly pronounced at 150° C.

The following examples in Table II illustrate the effect of various concentrations of the stabilizer. In each case the samples were maintained at 150° C. The chlorinated paraffin contained about 70% chlorine.

Table II

| Exam. No. | Time, hrs. | HCl GAS Evolved, mg. ||||||||
|---|---|---|---|---|---|---|---|---|---|
| | | Chlorinated Paraffin plus following Amounts of Bu$_2$Ph$_2$Sn— |||| Chlorinated Paraffin plus following Amounts of Bu$_3$PhSn— ||||
| | | 0% | 0.5% | 1% | 3% | 0% | 0.5% | 1% | 3% |
| 15 | 1 | 12.2 | 1.5 | 0.4 | 0.2 | 10.9 | 0.9 | 0.4 | 0.2 |
| 16 | 2 | 19.8 | 3.1 | 0.6 | 0.4 | 22 | 1.5 | 0.6 | 0.3 |
| 17 | 3 | 25 | 5 | 0.7 | 0.5 | | 2 | 0.6 | 0.3 |
| 18 | 4 | | 7.3 | 1 | 0.6 | | 2.4 | 0.6 | 0.3 |
| 19 | 5 | | 10.4 | 1.2 | 0.6 | | | 0.6 | 0.3 |
| 20 | 10 | | | 2 | 0.6 | | | 0.7 | 0.4 |
| 21 | 15 | | | 8 | 0.6 | | | 2.7 | 0.7 |

In the third, fourth, seventh and eighth columns of Table II, the dashes indicate that the measurement of gas was discontinued, the trend in each of these cases having been deemed sufficiently established.

The examples in Tables III and IV illustrate the extent to which a chlorinated paraffin of lower chlorine content, namely, about 40% chlorine, may be stabilized. In each table, the results were obtained at a temperature of 150° C. The procedure set forth in connection with Table I was followed in the runs of Table III. The purpose of Table IV is like that of Table II.

Table III

| Exam. No. | Time, hrs. | HCl Gas Evolved, mg. |||
|---|---|---|---|---|
| | | Chlorinated Paraffin Plus—: |||
| | | No Stabilizer | 1% Bu$_4$Sn | 1% Bu$_3$PhSn |
| 22 | 1 | 39 | 11.5 | 16 |
| 23 | 2 | 61 | 20 | 27 |
| 24 | 3 | 78 | 24 | 33 |
| 25 | 4 | 91 | 30 | 38 |
| 26 | 5 | 101 | 51 | 57 |

Table IV

| Exam. No. | Time, hrs. | HCl Gas Evolved, mg. ||||
|---|---|---|---|---|---|
| | | Chlorinated Paraffin Plus Following Amounts of Bu$_4$Sn— ||||
| | | 0% | 0.5% | 1% | 2% |
| 28 | 1 | 43 | 27 | 24 | 11 |
| 29 | 2 | 61 | 43 | 26 | 13 |
| 30 | 3 | 73 | 56 | 36 | 15 |
| 31 | 4 | 85 | 64 | 49 | 27 |

While the invention has been described in respect to more or less specific embodiments thereof, it will be appreciated that it is capable of obvious variations without departing from its scope.

In the light of the foregoing description, the following is claimed:

1. Chlorinated paraffins having about 10 to about 40 carbon atoms per molecule stabilized with up to about 5% by weight of a tin hydrocarbon compound of the formula R$_x$Ar$_{4-x}$Sn, in which R is the butyl radical, Ar is the phenyl radical, Sn is tin, and $x$ is a whole number equal to 1 to 4.

2. Chlorinated paraffins having about 10 to about 40 carbon atoms per molecule stabilized with up to about 5% by weight of butyltriphenyl tin.

3. Chlorinated paraffins having about 10 to about 40 carbon atoms per molecule stabilized with up to about 5% by weight of tetrabutyl tin.

4. Chlorinated paraffins having about 10 to about 40 carbon atoms per molecule stabilized with up to about 5% by weight of tributylphenyl tin.

5. Chlorinated paraffins having about 10 to about 40 carbon atoms per molecule stabilized with up to about 5% by weight of dibutyldiphenyl tin.

6. Method of stabilizing chlorinated paraffins having about 10 to about 40 carbon atoms per molecule which comprises adding to said chlorinated paraffins up to about 5% by weight of a tin hydrocarbon compound of the formula R$_x$Ar$_{4-x}$Sn, in which R is the butyl radical, Ar is the phenyl radical, Sn is tin, and $x$ is a whole number equal to 1 to 4.

7. Method according to claim 6 in which said tin hydrocarbon compound is butyltriphenyl tin.

8. Method according to claim 6 in which said tin hydrocarbon compound is tetrabutyl tin.

9. Method according to claim 6 in which said tin hydrocarbon compound is tributylphenyl tin.

10. Method according to claim 6 in which said tin hydrocarbon compound is dibutyldiphenyl tin.

JAMES M. CHURCH.
ERNEST W. JOHNSON.

REFERENCES CITED

The following references are of record in the file of this patent:

UNITED STATES PATENTS

| Number | Name | Date |
|---|---|---|
| 2,259,978 | McLean | Oct. 21, 1941 |

FOREIGN PATENTS

| Number | Country | Date |
|---|---|---|
| 545,500 | Great Britain | May 29, 1942 |